United States Patent [19]
Wagner

[11] 4,193,434
[45] Mar. 18, 1980

[54] PREASSEMBLED FASTENER UNIT FOR CLAMPING PLASTIC WORKPIECES

[75] Inventor: David P. Wagner, Geneva, Ill.

[73] Assignee: Illinois Tool Works Inc., Chicago, Ill.

[21] Appl. No.: 932,744

[22] Filed: Aug. 10, 1978

[51] Int. Cl.$^2$ ............................................. F16B 39/26
[52] U.S. Cl. ........................................ 151/38; 85/1 R
[58] Field of Search ................. 85/1 R, 50 R, 41; 151/37, 38; 10/155 R, 155 A

[56] References Cited

U.S. PATENT DOCUMENTS

| | | | |
|---|---|---|---|
| 1,320,259 | 10/1919 | Martens | 151/38 |
| 1,717,035 | 6/1929 | Holt | 151/35 X |
| 2,159,393 | 5/1939 | McCrudden | 151/38 |
| 2,275,315 | 3/1942 | Ray | 151/38 X |
| 2,779,376 | 1/1957 | Poupitch | 151/38 X |
| 2,817,380 | 12/1957 | Knohl | 151/38 |
| 3,016,941 | 1/1962 | Coldren | 151/38 |
| 3,054,213 | 9/1962 | Mathues | 85/1 R X |
| 3,315,720 | 4/1967 | Gutshall | 151/38 |
| 3,777,796 | 12/1973 | Takano | 85/1 R X |
| 4,102,239 | 7/1978 | Dallas | 151/38 X |

FOREIGN PATENT DOCUMENTS

| | | | |
|---|---|---|---|
| 481228 | 3/1938 | United Kingdom | 151/38 |
| 404965 | 3/1974 | U.S.S.R. | 151/37 |

*Primary Examiner*—Ramon S. Britts
*Attorney, Agent, or Firm*—Richard K. Thomson; Robert W. Beart

[57] ABSTRACT

A preassembled bolt and washer-like device designed for use in securing an upper, plastic-like workpiece to a lower support structure so that cold flow of the plastic is minimized while applying a relatively high clamp load to the joint. The washer includes a tubular sleeve having radially inwardly directed protuberances at the upper region of the inner wall designed to snap onto the shank of the bolt and be axially retained and free spinning therein. The upper extremity of the shank of the bolt includes a radial outward protuberance cooperating with the protuberance on the sleeve. The threaded region of the shank extends within the confines of the sleeve so the thread runout at the upper extremity of the shank will not prevent the sleeve from clampingly engaging the lower support structure.

13 Claims, 8 Drawing Figures

PREASSEMBLED FASTENER UNIT FOR CLAMPING PLASTIC WORKPIECES

BACKGROUND AND SUMMARY OF THE INVENTION

This invention relates broadly to a preassembled bolt and washer and more particularly to a fastening system for clamping and securing a plastic workpiece to a supporting workpiece.

With the increasing use of plastic and plastic-like material to replace steel and other sheet metal materials, a particular fastening problem has become apparent. Though plastic materials do provide certain weight, cost and corrosive resistant advantages over various sheet metal materials, the plastic does suffer from an inability to accept a load without deformation. The well-known phenomena of creeping or cold flow prevents a plastic material from being an element in a tightly clamped fastening joint. In most threaded fastening applications it is imperative that the threaded fastener not lose a predetermined tension or the fastener will become loosened and ineffective in the joint. Obviously, if a plastic material is an upper sheet to be secured to a lower structure under the compressive load of a threaded fastener, such as a bolt, the natural physical tendency of the plastic would be to flow under such load, thus releasing the desired tension in the joint.

Various spring load distributing washers have been suggested with little success in solving the problem.

It is therefore a primary object of the invention to produce a fastening system which incorporates a threaded bolt and washer-like device which effectively eliminates the compressive load on a plastic workpiece.

A further object of the invention is to produce a preassembled fastening unit which is useful in fastening a plastic workpiece to a supporting structure.

Yet a further object of the invention is a preassembled fastening unit which minimizes the deleterious effects of a clamping load on a plastic workpiece while maximizing the size of a fastener and load-bearing capability of such fasteners.

The objects and advantages of the invention are obtained by the fastener unit described herein which incorporates an elongated threaded fastener, such as a bolt, preassembled with a washer-like device having a tubular sleeve portion and a radially extending flange spring portion at its upper extremity. The threaded fastener is provided with an annular protuberance of a predetermined radial dimension greater than the crest diameter of the thread located closely adjacent to the bearing surface of the head of the bolt. The washer-like device is provided with a radially inwardly extending protuberance at the uppermost extremity of the sleeve wall so that the washer and bolt may be snappingly preassembled to one another and yet be free spinning. The threaded shank will extend upwardly within the lower portion of the sleeve to insure that there is no interference between the shank and tapped mating hole in the support structure which could prevent the sleeve from receiving the clamping load of the fastened joint. The bolt may further be provided with an unthreaded shank region of a limited axial extent between the bearing surface of the head and the annular protuberance with the transverse dimension of the unthreaded shank region being approximately equal to the crest diameter of the shank thereby maximizing the loading capabilities of the bolt.

The spring portion of the washer is preferably configured to be substantially conical with the outermost perimeter being spaced upwardly from the lowermost extremity of the sleeve a distance substantially equal to the thickness of the plastic workpiece to be fastened. Spring characteristics of the radial flange may be varied by various alternative structures to reduce the spring load on the plastic while maximizing the total clamping load capacity of the column or load bearing strut created by the sleeve portion.

These and other objects will become apparent from the following detailed description taken in conjunction with the accompanying drawing.

DETAILED DESCRIPTION OF THE PREFERRED EMBODIMENT

Figure 1:
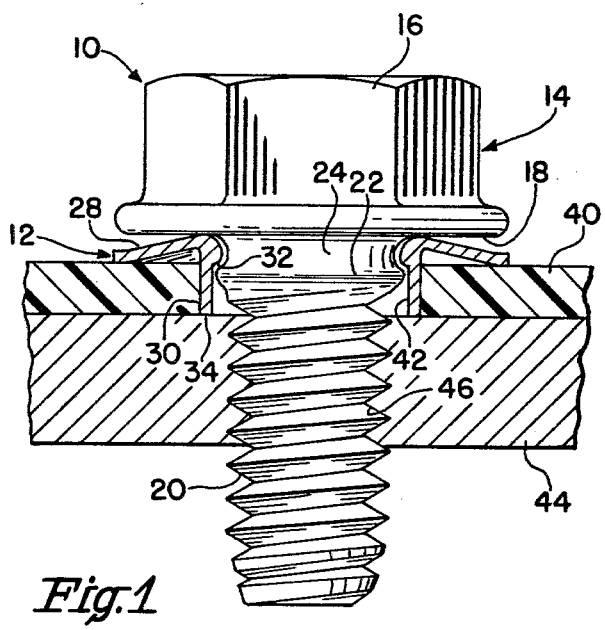
FIG. 1 is a view of the fastener unit of the invention in partial section shown securing a plastic workpiece to a supporting structure.

Turning first to FIG. 1, the fastener unit 10 of the invention is shown in its preferred application of securing a plastic-like work panel 40 to a lower supporting structure, such as a steel panel 44 having a threaded aperture 46.

In accordance with the invention, the fastener unit 10 includes a washer-like device 12 axially secured to a bolt 14 in such a manner as to permit free rotation relative thereto.

Figure 2:
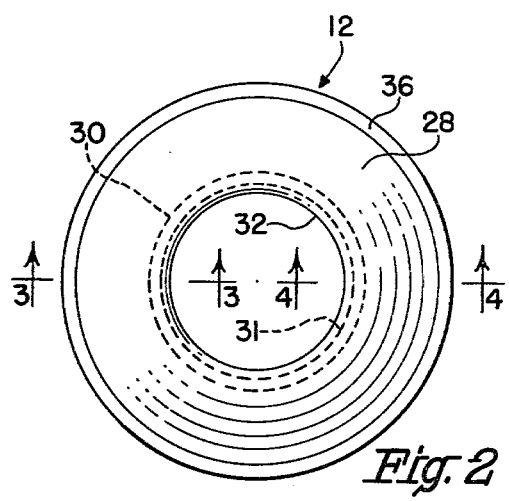
FIG. 2 is a top plan view of the washer device incorporated in the fastener unit of this invention.
Figures 3, 4:
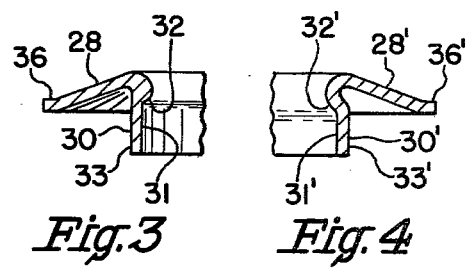
FIG. 3 is a partial cross-sectional view showing a preferred retention structure of the washer as taken along the lines 3—3 of FIG. 2.
FIG. 4 is a partial cross-sectional view of an alternate retention structure of the washer as would be taken along lines 4—4 of FIG. 2.

Turning to FIGS. 2 and 3, it will be shown that the preferred embodiment of the washer 12 includes an axially extending tubular sleeve portion 30 and a generally radially outwardly and downwardly directed flange 28 extending from the uppermost extremity of the sleeve. The flange, in a preferred embodiment, is configured to be essentially conical with a flattened rim surface 36 at its outer periphery. The lowermost extremity 34 of the sleeve is spaced downwardly from the outermost perimeter of the flange a distance preferably equal to and not greater than the thickness of a plastic panel 40 but not substantially less than said thickness for purposes to be described later herein.

It is important to note in the FIG. 3 embodiment that the wall thickness of the sleeve region 30 is substantially constant except for a slightly thicker region at the uppermost extremity at the inner wall 31 forming a limited axial extent annular ledge 32. This constant wall thickness contributes to a reliably sturdy load bearing strut construction. However, as shown in FIG. 4, the sleeve 30 could be of entirely uniform thickness with outer wall 33 totally paralleling inner wall 31 forming a retention ledge 32' with a slight annular depression forming in the uppermost extremity of outer wall 33'. This alternate configuration could provide a stiff spring in the strut which may be useful in insuring that a proper clamping load is applied to the joint over a range of conditions.

Turning again to FIG. 1, the preassembly means for the washer and bolt and more particularly the annular ledge 32 of washer 12 with a particularly designed bolt 14 will be shown. The bolt 14 will include a radially enlarged driving head 16 with appropriate torque applying flat surfaces. The head will include a substantially planar lower bearing surface 18 and the outer perimeter of the head will be of the dimension substantially equal to the outer diameter of the associated washer 12. The bolt is provided with a threaded shank region 20 with threads having a predetermined crest and root diameter. It is important to note that when the washer 12 is associated with the bolt, the uppermost extremity of the thread impression region extends up into and is in part encompassed by the lowermost region of the sleeve 30. An annular protrusion or radially extending ledge 22 is formed in the uppermost extremity of the shank very close to the bearing surface 18 but spaced downwardly therefrom. An unthreaded shank region 24, which is preferably of a diameter substantially equal to the crest diameter of the shank of the threaded shank region 20 to maximize the tensile strength of the bolt is formed intermediate ledge 22 and the bearing surface 18.

The washer unit 12 is preassembled to the bolt 14 by telescopically associating one with the other and snappingly engaging the ledge 22 on the bolt beneath annular protuberance 32 on the washer. This secures the washer to the bolt at its uppermost extremity so that the compressive clamping load exerted on the joint may be applied directly to the innermost periphery of the washer through the sleeve, acting as a strut or load bearing column. The lowermost extremity 34 of sleeve 30 abuts the peripheral surface area surrounding the threaded bore 46 in the lower support structure 44. Thus, a highly compressive load may be applied to the joint without being applied to the upper, plastic workpiece 40. It is however frequently desired and required that a slight clamping or holding pressure be applied to the plastic in the region of the joint. For this purpose, the spring flange 28 forms an important function. The spring constant of the flange 28 may be varied to suit the particular application but it could become important to provide the outermost perimeter of the flange with a flattened region 36 to distribute the load over a surface area rather than at a line contact. It should be noted that the plastic workpiece 40 has a clearance hole 42 formed therein which is of a diameter greater than the outer diameter of the sleeve so that there is no interference therebetween.

Figure 5:
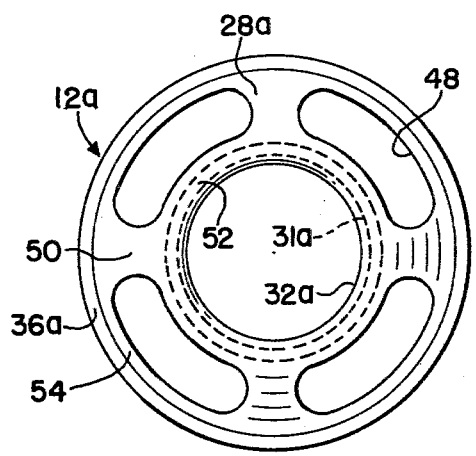
FIG. 5 is a top plan view of an alternate embodiment of the washer device shown in FIG. 2.

As noted above, various modifications may be made to the spring-like flange 28 in order to reduce the spring constant for any given application and yet maintain the load bearing characteristics in the strut or sleeve 30. For example, FIG. 5 shows an alternate embodiment of washer 12a similar to washer 12 in that it includes a spring flange 28a with the annular protuberance 32a formed at the upper extremity of the inner wall 31a of the sleeve. However, it should be noted that a plurality of closed apertures 48 are created in the flange is circumferentially spaced locations radially outwardly of inner peripheral surface 52, thus effectively forming a plurality of interconnected spring arm regions 50 and outer peripheral load bearing regions 54. Portions or all of 54 could again be flattened regions 36a. The spring rate and load bearing characteristics of such a washer would be significantly less than the embodiments shown in FIGS. 1–3.

Figure 6:
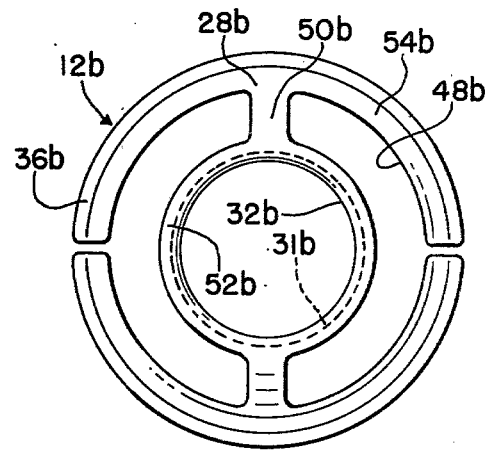
FIG. 6 is a top plan view of a further embodiment of the washer device shown in FIG. 2.

Turning to FIG. 6, a further embodiment of a washer device is shown which attempts to minimize the load applied for a given spring thickness while not affecting the load bearing characteristics of the sleeve. In such an embodiment, the washer 12b again includes a plurality of apertures 48b radially beyond an inner peripheral region 52b. However, a limited number of narrow arms 50b are formed to drastically reduce the spring pressure. The lowermost extremity of these arms are integrally connected to load bearing and distributing foot surfaces 54b which therefore provide a minimum plurality of independently flexing yet large load distributing elements. A flattened rim 36b would form all or part of foot surfaces 54b. Again, the preassembly structure will remain the same in that annular ledge 36b will be formed at the upper perimeter of the sleeve 30b.

Figure 7:
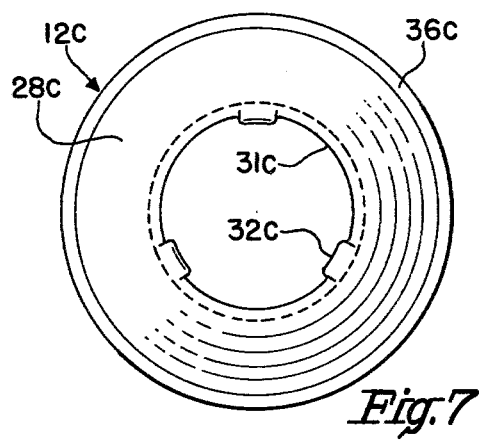
FIG. 7 is a top plan view of yet a further embodiment of the washer device showing alternate means of preassembly to the bolt.

Turning to FIG. 7, a further embodiment of the washer will be shown. In keeping with the invention, washer 12c includes a tubular sleeve 30c of constant wall thickness and a spring flange 28c radially extending from the uppermost extremity of the sleeve. However, a plurality of coined depressions 32c are created at the inner periphery of the flange to produce the retention means for association with an annular ring 22 on a bolt. A discrete plurality of circumferentially spaced protuberances 32c provide limited frictional contact between the bolt and washer and thus maximize the free-spinning capabilities of the washer in the preassembled unit.

Figure 8:
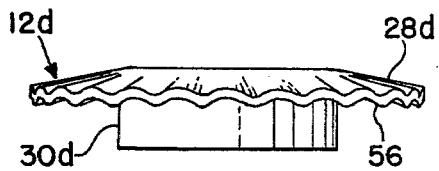
FIG. 8 is a side elevational view, on a reduced scale, of yet a further embodiment of a washer for use in the invention.

When desired, a limited amount of cold flowing could be advantageous. The invention described herein could conceivably be modified to accomplish this result. For example, in FIG. 8, a washer 12d is shown which basically includes a sleeve 30d and spring flange 28d cooperatively secured to a bolt (not shown) in the manner or manners described above. However, the bolt could include cogs or the like on at least the inner periphery of its lower bearing surface. The cogs would preferably be configured to have a camming surface in the "on" direction and a stop surface in the "off" direction. Such configurations are well known in the prior art. The flange 28d, however, is configured to have a plurality of corrugations extending radially. Corrugations 56 at the outer periphery permit limited cold flow to effectively restrain rotation of the washer when in a clamped condition. The one way cogs on the bolt could coact with the inner periphey of corrugation to prevent retrograde rotation of the unit once it is fastened.

While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

I claim:

1. A fastener unit including a washer member and a headed rotary threaded fastener which is preassembled with said washer, said fastener unit adapted for use with an upper, apertured, workpiece of predetermined thickness which is subject to cold flow or creep in load bearing applications, said washer member including an axially extending sleeve of substantially uniform wall thickness and predetermined axial extent, a radially outwardly and downwardly directed spring flange extending from the uppermost extremity of the sleeve, the outermost periphery of said flange spaced downwardly a predetermined distance from the innermost periphery, said outermost periphery of said flange spaced upwardly a predetermined distance from the lowermost extremity of said sleeve, the thread impressions on the shank of the rotary threaded fastener being of predetermined crest and root diameters, the uppermost extremity of said thread impressions being spaced a predetermined axial distance from the lower bearing surface of the head to create an unthreaded shank portion, said distance being less than the predetermined axial extent of the sleeve so that at least a portion of the thread impression extends upwardly within the sleeve when in preassembled condition, the inner periphery of the sleeve being of a diameter greater than the crest diameter of the thread impression on the shank, an annular protuberance formed on said unthreaded shank portion having a predetermined height said protuberance presenting a diameter greater than said crest diameter, a radial inwardly extending protuberance means of very limited axial extent formed adjacent the juncture of the sleeve with the flange of said washer and creating a constricted aperture in the sleeve of a diameter less than the diameter of the annular protuberance on the shank but greater than the crest diameter of the thread impression, the predetermined length of said unthreaded shank portion being substantially equal to the height of the annual protuberance of the fastener plus the axial extent of the washer protuberance.

2. The fastener unit in accordance with claim 1, wherein the flange is substantially frusto-conical thus forming a compressible spring.

3. The fastener unit of claim 1, wherein the lowermost extremity of the sleeve is spaced downwardly from the outermost periphery of the flange a distance not greater than and substantially equal to the predetermined thickness of the upper workpiece.

4. The fastener unit of claim 1, wherein the inwardly extending protuberance means on the wall of the sleeve is a continuous annular ledge.

5. The fastener unit of claim 1, wherein the inwardly extending protuberance means is a plurality of circumferentially spaced, limited, width protuberances.

6. The fastener unit of claim 1, wherein the unthreaded shank portion intermediate the annular protuberance of the shank and the bearing surface of the head is of a diameter not less than the crest diameter of the thread impression.

7. The fastener unit of claim 1, wherein the washer includes a plurality of circumferentially spaced apertures located in the flange adjacent the inner periphery thereof to reduce the spring force exerted on the upper workpiece.

8. The fastener unit of claim 2 wherein the frusto-conical flange includes a flattened peripheral bearing surface at the outer periphery thereof.

9. The fastener unit of claim 7, wherein the apertures are closed.

10. The fastener unit of claim 7, wherein the apertures form a plurality of relatively narrow downwardly extending spring arms each integrally connected to a flattened outer peripheral base portion, each arm and associated base forming an independently flexing spring unit creating relatively broad surface contact and a relatively light spring force on the upper workpiece.

11. The fastener unit of claim 1, wherein the flange includes radially extending corrugations.

12. The fastener unit of claim 1, wherein the sleeve includes means providing a stiff spring in the clamping joint.

13. A washer for preassembly with a headed rotary threaded fastener, said fastener having an unthreaded shank portion beneath the head, threads with a predetermined crest diameter, a protuberance of predetermined axial extent on the unthreaded portion, said protuberance having a diameter greater than said thread crest diameter, said washer comprising an axial extending sleeve of substantially uniform wall thickness and a predetermined axial extent which exceeds the length of the unthreaded portion of the fastener; a radially outwardly and downwardly directed spring flange extending from the uppermost extremity of the sleeve and having a frusto-conical configuration; an annular protuberance means extending inwardly from a point adjacent the juncture of the sleeve with the flange and having an axial extent generally equal to the length of the unthreaded fastener the sleeve, the outermost periphery of said flange spaced downwardly a predetermined distance from the innermost periphery, said outermost periphery of said flange spaced upwardly a predetermined distance from the lowermost extremity of said sleeve, the thread impressions on the shank of the rotary threaded fastener being of predetermined crest and root diameters, the uppermost extremity of said thread impressions being spaced a predetermined axial distance from the lower bearing surface of the head to create an unthreaded shank portion, said distance being less than the predetermined axial extent of the sleeve so that at least a portion of the thread impression extends upwardly within the sleeve when in preassembled condition, the inner periphery of the sleeve being of a diameter greater than the crest diameter of the thread impression on the shank, an annular protuberance formed on said unthreaded shank portion having a predetermined height said protuberance presenting a diameter greater than said crest diameter, a radial inwardly extending protuberance means of very limited axial extent formed adjacent the juncture of the sleeve with the flange of said washer and creating a constricted aperture in the sleeve of a diameter less than the diameter of the annular protuberance on the shank but greater than the crest diameter of the thread impression, the predetermined length of said portion less the axial extent of the protuberance on the fastener, the inner diameter of the washer protuberance means being less than that of the fastener protuberance but greater than that of the thread crests so that the protuberance means of the washer may be pushed past the protuberance of the fastener to form a fastener assembly.

* * * * *

UNITED STATES PATENT AND TRADEMARK OFFICE
CERTIFICATE OF CORRECTION

PATENT NO. : 4,193,434

DATED : MARCH 18, 1980

INVENTOR(S) : DAVID P. WAGNER

It is certified that error appears in the above-identified patent and that said Letters Patent is hereby corrected as shown below:

In Claim 13, Column 6, line 31, "the sleeve, the outermost periphery" is hereby deleted;

lines 32-56 are hereby deleted in their entirety;

line 57, "length of said" is hereby deleted.

Signed and Sealed this

Fourth Day of August, 1992

Attest:

DOUGLAS B. COMER

*Attesting Officer*     *Acting Commissioner of Patents and Trademarks*